(12) United States Patent
Samuel et al.

(10) Patent No.: US 6,839,783 B2
(45) Date of Patent: Jan. 4, 2005

(54) PROGRAMMABLE STATE MACHINE INTERFACE

(75) Inventors: Roshan J. Samuel, Richardson, TX (US); Brian J. Karguth, Van Alstyne, TX (US); Gregory L. Christison, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 372 days.

(21) Appl. No.: 09/732,135

(22) Filed: Dec. 7, 2000

(65) Prior Publication Data

US 2004/0221078 A1 Nov. 4, 2004

(51) Int. Cl.$^7$ .............................................. G06F 13/00
(52) U.S. Cl. ...................... 710/107; 710/305; 711/105; 713/400
(58) Field of Search ................................ 710/107, 305, 710/20; 711/105; 327/99, 141, 239; 713/400

(56) References Cited

U.S. PATENT DOCUMENTS 4,970,418 A * 11/1990 Masterson ................... 327/141
5,986,491 A * 11/1999 Grehl et al. .................. 327/239
6,279,073 B1 * 8/2001 McCracken et al. ......... 711/105
6,429,698 B1 * 8/2002 Young .......................... 327/29
6,542,999 B1 * 4/2003 Dreps et al. .................. 710/20

* cited by examiner

Primary Examiner—Khanh Dang
(74) Attorney, Agent, or Firm—J. Dennis Moore; Wade James Brady, III; Frederick J. Telecky, Jr.

(57) ABSTRACT

A state machine interface that can be used with digital devices whose interface characteristics are not known in advance. This interface is completely programmable on a clock-by-clock basis. The interface consists of an output component, which can be either a control register or a data bus, and an input component that can be combined to provide various input/output (I/O) functions. The state machine interface of this invention makes it possible to interface with many type of application devices, whose interface characteristics and/or waveforms may not be identical or are not known at the time a particular state machine is designed.

9 Claims, 9 Drawing Sheets

FIG. 5B
FROM FIG. 5A

PROGRAMMABLE STATE MACHINE INTERFACE

BACKGROUND OF THE INVENTION

1. Field of the Invention

The present invention relates to sequential state machines and particularly to the methods and apparatus for providing a programmable interface to these machines.

2. Description of Background Art

Existing techniques used in designing finite state machines require that the nature and all possible variations of the state machine interface be known in advance. What is needed is a method and apparatus that can be used to build interfaces between components whose interface waveform characteristics are not known in advance; i.e., the state machine is required to interface with different kinds of devices whose interface waveforms are not identical. Often times, even different manufacture's versions of the same kind of devices are not identical. This requires that register transfer level (RTL) logic be coded into the state machine to handle the appropriate interface. As a result, there is limited programmability for modifying the state machine behavior.

Figure 1:
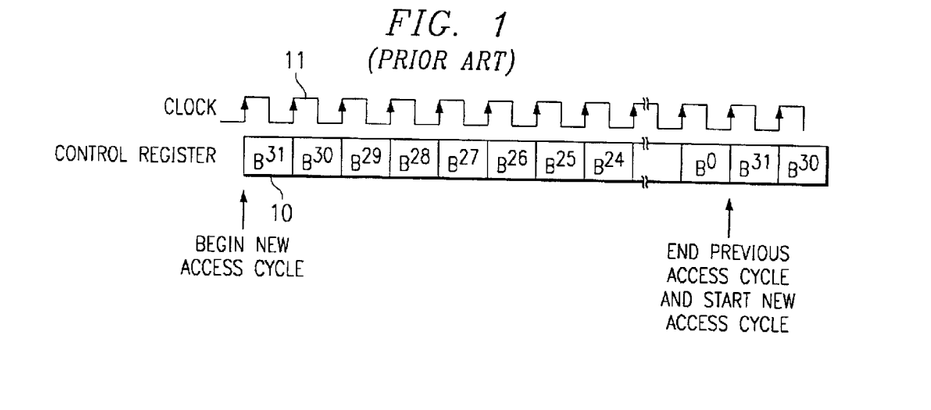
FIG. 1 shows the bit assignment of a typical prior art access cycle for a state machine interface.

FIG. 1 shows the bit assignment of a control register 10 and its clock waveform 11 for a typical state machine interface (SMI). As illustrated, the design of a state machine interface is usually based around access cycles, which is defined as the period of time during which the pins on the interface repeat a sequence of events. This sequence may be anything the designer chooses and as mentioned earlier, is often established using RTL coded circuitry. The control register 10 shown has 32-bits and counts DOWN from B31 to B0, although this register could have any number of bits and could also just as well count UP.

Each input and output of the interface is controlled by one or more of these control registers 10 on a cycle-by-cycle basis. Each bit in the register corresponds to one clock 11 cycle. The state, using the registers 10, can be changed on either the leading (positive) edge (as shown) or the trailing (negative) edge of the clock 11. For example, in the case of the output control register 10, a binary 1 in location B31 will cause the state machine output pin to go HIGH on the positive edge of the first clock cycle in the access cycle, and a binary 0 in location B30 will cause the output to go LOW during the second clock cycle in the access cycle, and so forth. Although the largest access cycle supported in this example is 32 clock cycles, this can be any size.

State machines are required to start each cycle at a predictable point in time, shown as the 'begin new access cycle' in FIG. 1, in order to properly synchronize the state machine with the interface it is "talking" to. This synchronization can be such that the state machine is configured as a slave or as the master.

When the state machine is configured as a slave, it uses an external input strobe from the application device to determine the clock cycle at which a new access cycle should begin. The synchronization can occur on either the positive or negative edge of the strobe pulse signal. Alternatively, synchronization can be chosen to occur when the strobe is HIGH or LOW for applications such as FIFO interfaces, where any state machine accessing the FIFO may have to start or stop depending on the state of an "empty" or "full" signal.

On the other hand, in the case where the state machine is the master, placing the burden of synchronization on the application device, the strobe input pin can be inhibited by connecting it to a suitable voltage level.

What is needed is a state machine interface that is completely programmable for use with any device without apriori knowledge of the detailed specifics of the device. The state machine interface disclosed herein addresses this need by providing an interface that can be programmed for use with multiple non-compatible devices.

SUMMARY OF THE INVENTION

In its broader aspect, the present invention is a finite state machine interface that can be programmed, on a clock-by-clock basis, for use with digital devices whose interface characteristics are not known in advance. The building blocks for the disclosed invention include an input component and an output component. The output component can function as either a control register or a data bus. According to the preferred embodiment of the invention, these blocks are combined to provide an input/output (I/O) function that can interface with many types of digital application devices whose interface characteristics are not identical or are not known apriori. An output and an input component are connected by means of tri-state buffers to the I/O pin, which is coupled to an application device. The control register (memory) output component provides a sequential control signal to the application device when the I/O is selected as an output, while the input component receives an input from the application device and provides a sampled output when the I/O is selected as an input. This circuitry can be used to drive a single digital application device or can be repeated multiple times on a bus to drive additional devices. The control register of a second output component is used to determine when the I/O function is an output or an input.

In a second embodiment of the invention, the control register output component for controlling each application device is replaced by an output data bus, so that whatever data is on the bus can be supplied to the application device.

The embodiments of the invention overcome the need, found in most conventional approaches, of knowing in advance all possible types of interfaces that may exist and then coding these with appropriate logic in the state machine hardware. As a result, state machines outfitted with the interface of the present invention can be simply programmed to interface with devices it was not originally designed for use with.

DETAILED DESCRIPTION OF THE PREFERRED EMBODIMENTS

The preferred embodiment of a finite state machine interface circuit and method in accordance with the present invention is completely programmable without any apriori knowledge of the applications for which it is used. This interface consists of an output component building block, which can, for example, be a control register or an output data bus, and an input component building block. These building blocks can be combined to form the various input/output (I/O) embodiments of this invention. The control register output component consists of a register (memory), which is programmable by the system designer to provide a sequential control signal to the application device when the I/O is selected as an output. Without any prior knowledge of an application, this register can be programmed by any number of conventional methods, for example by means of a microprocessor. On the other hand, the input component receives an input from the application device and provides a sampled output when the I/O is selected as an input. First, the control register output component block, the data bus output component block, and the input component block are discussed individually below, followed by input/output (I/O) embodiments of the present invention.

Figure 2:
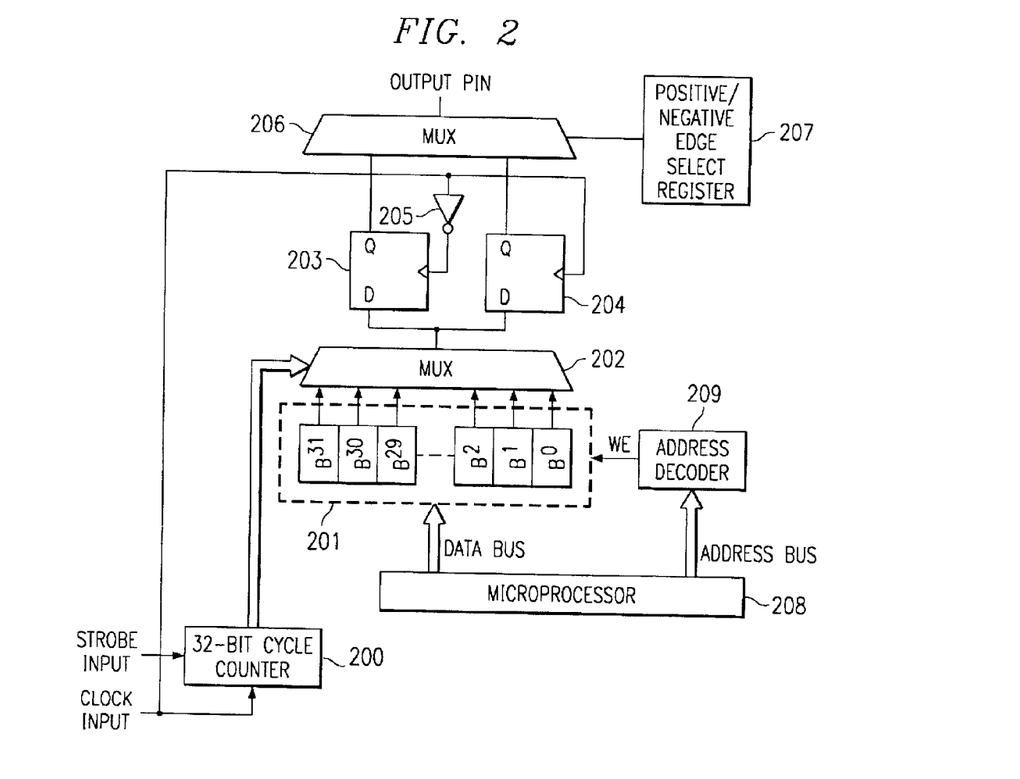
FIG. 2 is a block diagram of the control register output component used to control the I/O pins in the preferred embodiment of the programmable state machine interface of the present invention.

FIG. 2 is a block diagram of the control register output component used to control the I/O pins in the preferred embodiment of the programmable state machine interface of the present invention. This component can be used to both control the I/O bus configuration for one or more I/O pins and as the output component to control each application device in the embodiments of the present invention. The control register output component comprises a cycle counter 200, an output control register 201, an input multiplexer 202, two D-flip-flops 203–204, a clock input inverter 205, an output multiplexer 206, and a positive or negative edge selection register 207. A microprocessor 208 and address decoder 209 are shown as a means for the designer to program the sequential code into the control register (memory) 201, although any conventional means for programming the register can be used. Also, the cycle counter is shown as a 32-bit counter, but any number of bits can be used.

The 32-bit cycle counter 200 (also called control signal generator) is used to serialize the digital data stored in the control register 201. This counter starts counting at the beginning of an access cycle, which is determined by the synchronization method as described above. As mentioned, the output control register 201 is completely programmable and contains the required sequential pattern to control the I/O interface. For example, if the control register bit B30 is a binary 1, the output pin goes HIGH during the second clock period of the access cycle. Similarly, if bit B29 is a binary 0, then the output pin will go LOW during the third clock period of the access cycle, and so forth. Each bit of the control register 201 is connected on a bit-by-bit basis to the corresponding input bits of multiplexer 202. The 32-bit cycle counter 200 is used to sequentially select the control bits at the output of the multiplexer 202. The output of the multiplexer 202 is simultaneously coupled to the 'D' inputs of two flip-flops 203–204, one of which has its clock driven by the clock signal and the other which has its clock driven by an inverted clock signal by means an inverters 205. The Q outputs of these flip-flops 203–204 switch states on the leading and trailing edge of the clock signal, respectively. These Q outputs are connected to the inputs of output multiplexer 206 and one or the other signal is selected at the multiplexer's output depending on the state of the positive/negative edge select register 207, which is used to select the clock edge that the output transitions on. Thus the output pin of the control register output component can be changed in a sequential pattern and made to transition on either the positive or negative edge of the clock.

In operation, the output of multiplexer 202 is stepped through the bits of the control register 201 by means of the cycle counter 200. The output of the multiplexer 202 represents the desired sequential pattern of the state machine that controls the I/O pins going to the application device. The output of the multiplexer 202 is connected to a pair of dual D flip-flops 203–204, where the output of flip-flop 203 transitions on the leading edge of the clock and output of the other flip-flop 204 transitions on the trailing edge of the clock. Finally, output multiplexer 206, controlled by positive/negative edge select registers 207 selects one or the other of the D flip-flop outputs as the output to control the I/O pin.

Figure 3A:
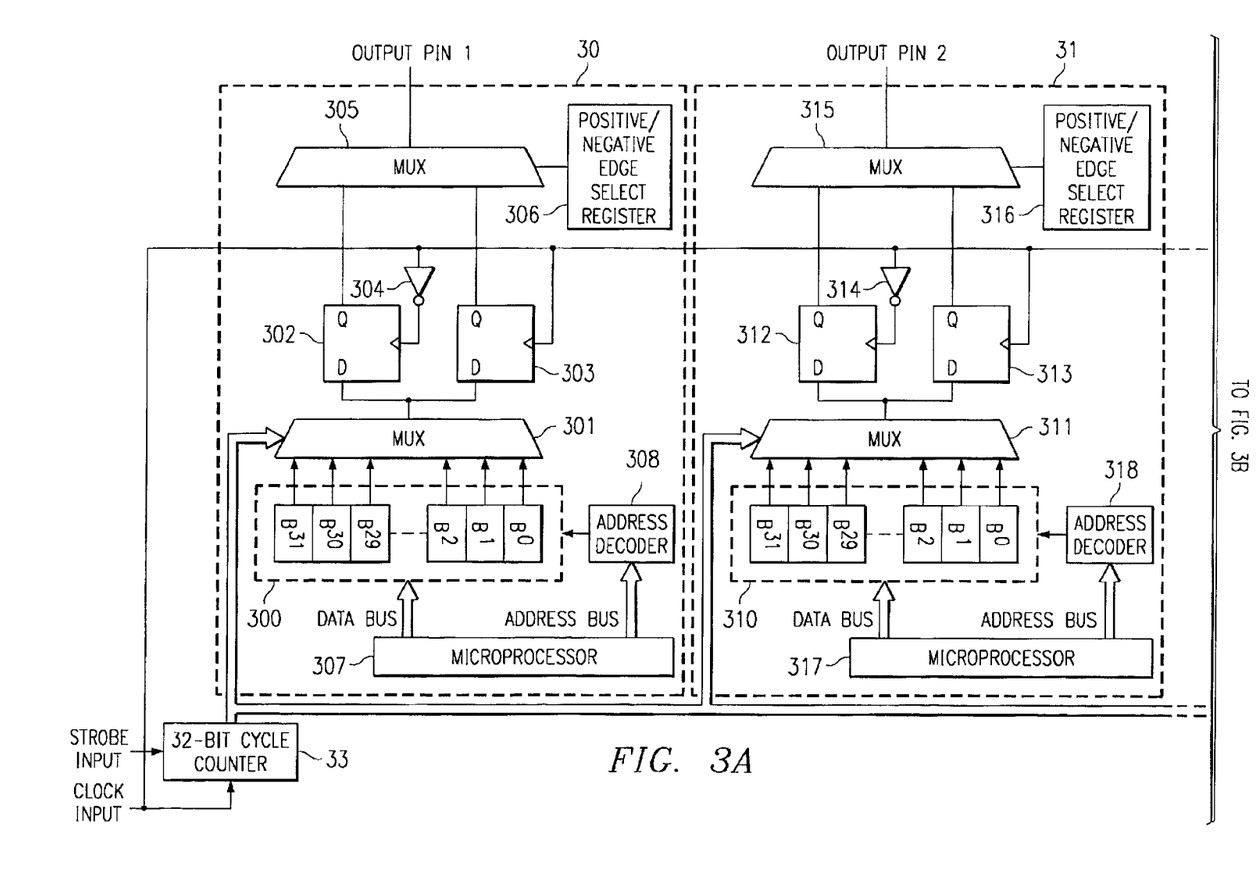
FIG. 3 is a block diagram of the control register output component used to control the bus output pins in the preferred embodiment of the programmable state machine interface of the present invention.
Figure 3B:
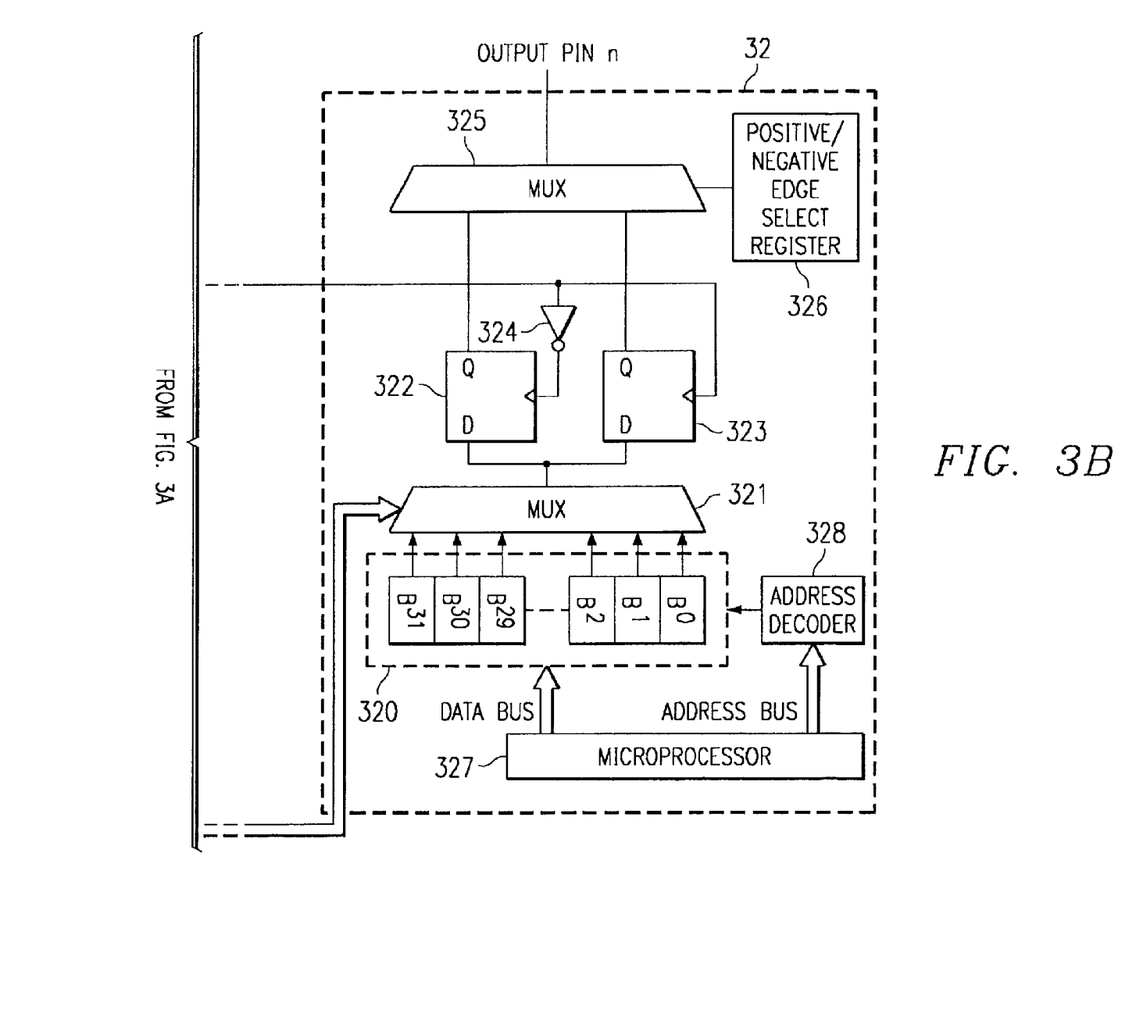

As mentioned earlier, the output component can also be used to control each digital application device. FIG. 3 is a block diagram for the preferred embodiment of the present invention, where the output component is configured with a control register. This configuration can be used with one output pin going to a single application device or with multiple output pins on a bus going to multiple application devices, as shown. This component is comprised of a cycle, counter 33 and output bus pin blocks (1 through n) 30–32 necessary to drive the various digital devices involved. The Figure shows output pin 1 block 30, output pin 2 block 31, up to output pin n block 32, as required by a particular application. Each of these output blocks 30–32 further comprises a control register 300, 310, 320, an input multiplexer 301, 311, 321, two D-flip-flops 302–303, 312–313, 322–323, a clock input inverter 304, 314, 324, an output multiplexer 305, 315, 325, and a positive or negative edge selection register 306, 316, 326, respectively. Also shown for each application device, is a microprocessor 307, 317, 327 and an address decoder 308, 318, 328, as one means for programming the serialized sequential code into the control register.

The 32-bit cycle counter 33 starts counting at the beginning of an access cycle, which is determined by the synchronization method as described above. The output control registers 300, 310, 320 are completely programmable registers that contain the required sequential pattern for the various device output pins. For example, if one of the control register's bit B30 is a binary 1, the corresponding output pin will go HIGH during the second clock period of the access cycle. Similarly, if bit B29 is a binary 0, then its corresponding output pin will go LOW during the third clock period of the access cycle, and so forth. Each control register 300, 310, 320 is connected on a bit-by-bit basis to the corresponding input bits of input multiplexers 301, 311, 321, respectively. The 32-bit counter 33 (32-bits used in this example) is then used to sequentially select the control bits at the output of the multiplexers. The output of the each multiplexer 301, 311, 321 is simultaneously coupled to the 'D' inputs of two flip-flops 302–303, 312–313, 322–323, one of which has its clock driven by the clock signal and the other which has its clock driven by an inverted clock signal by means of inverters 304, 314, 324. The Q outputs of the each pair of flip-flops 302–303, 312–313, 322–323 switch states on the leading and trailing edge of the clock signal, respectively. These Q outputs are connected to the inputs of output multiplexers 305, 315, 325, respectively, and one or the other signal is selected at the multiplexer outputs depending on the state of positive/negative edge select registers 306, 316, 326, which controls these output multiplexers. Thus, in this embodiment the output pin to each external application device can individually be changed in a sequential pattern and made to transition on either the positive or negative edge of the clock.

In operation, multiplexers 301, 311, 321 are stepped through the programmed bits of the control registers 300, 310, 320, by means of the cycle counter 33. The output of the input multiplexers 301, 311, 321, represents the desired sequential pattern of the state machine for each application device. The output of each input multiplexer is then fed into pairs of dual D flip-flops 302–303, 312–313, 322–323, where the outputs of flip-flops 302, 312, 322 transition on the leading edge of the clock and the outputs of the other flip-flops 303, 313, 323 transition on the trailing edge of the clock. Finally, output multiplexers 305, 315, 325, controlled by positive/negative edge select registers 306, 316, 326, selects one or the other of the D flip-flop outputs as the output to the various application devices.

Figure 4A:
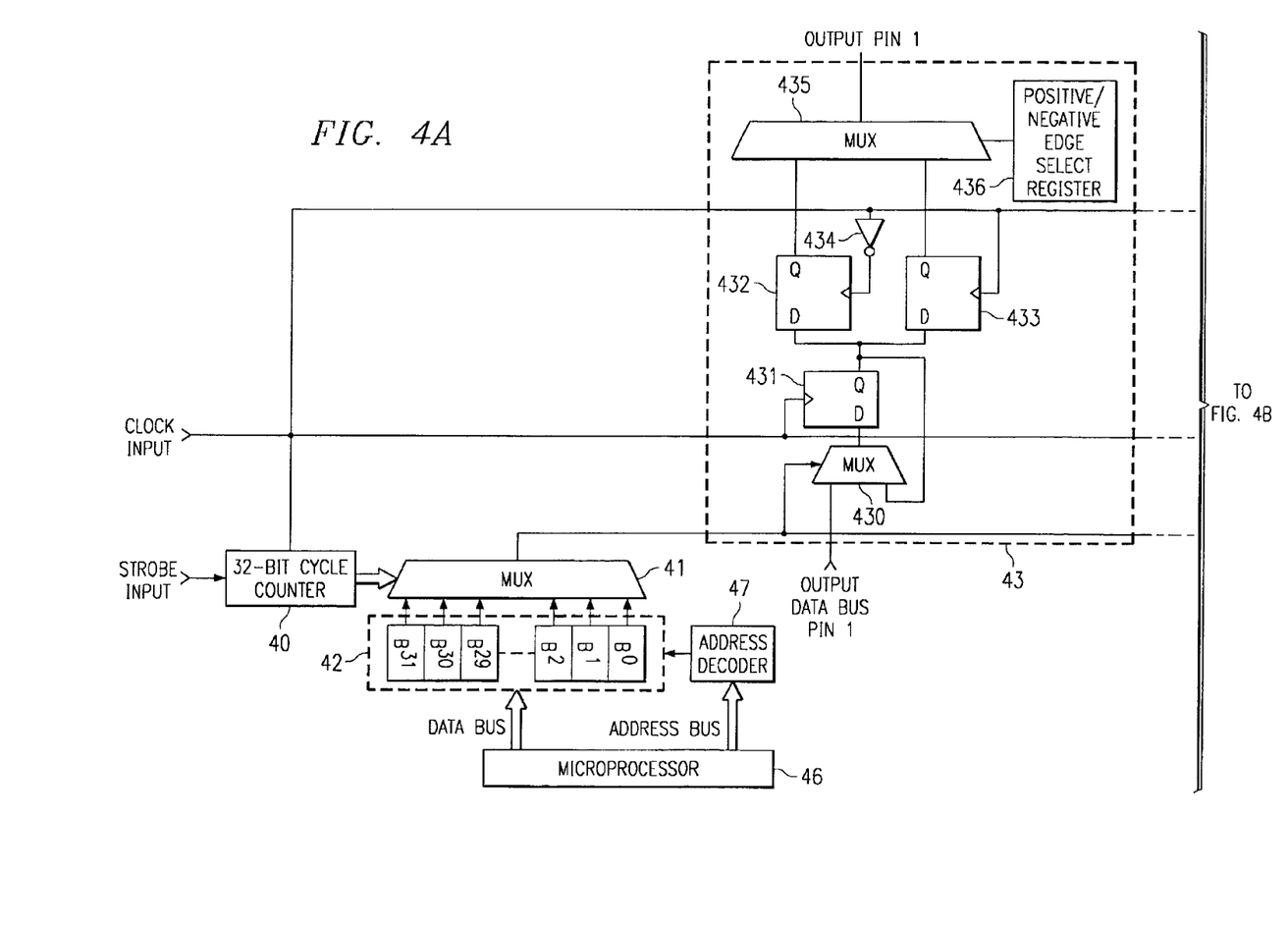
FIG. 4 is a block diagram of the data bus output component used to drive the bus output pins in a second embodiment of the programmable state machine interface of the present invention.
Figure 4B:
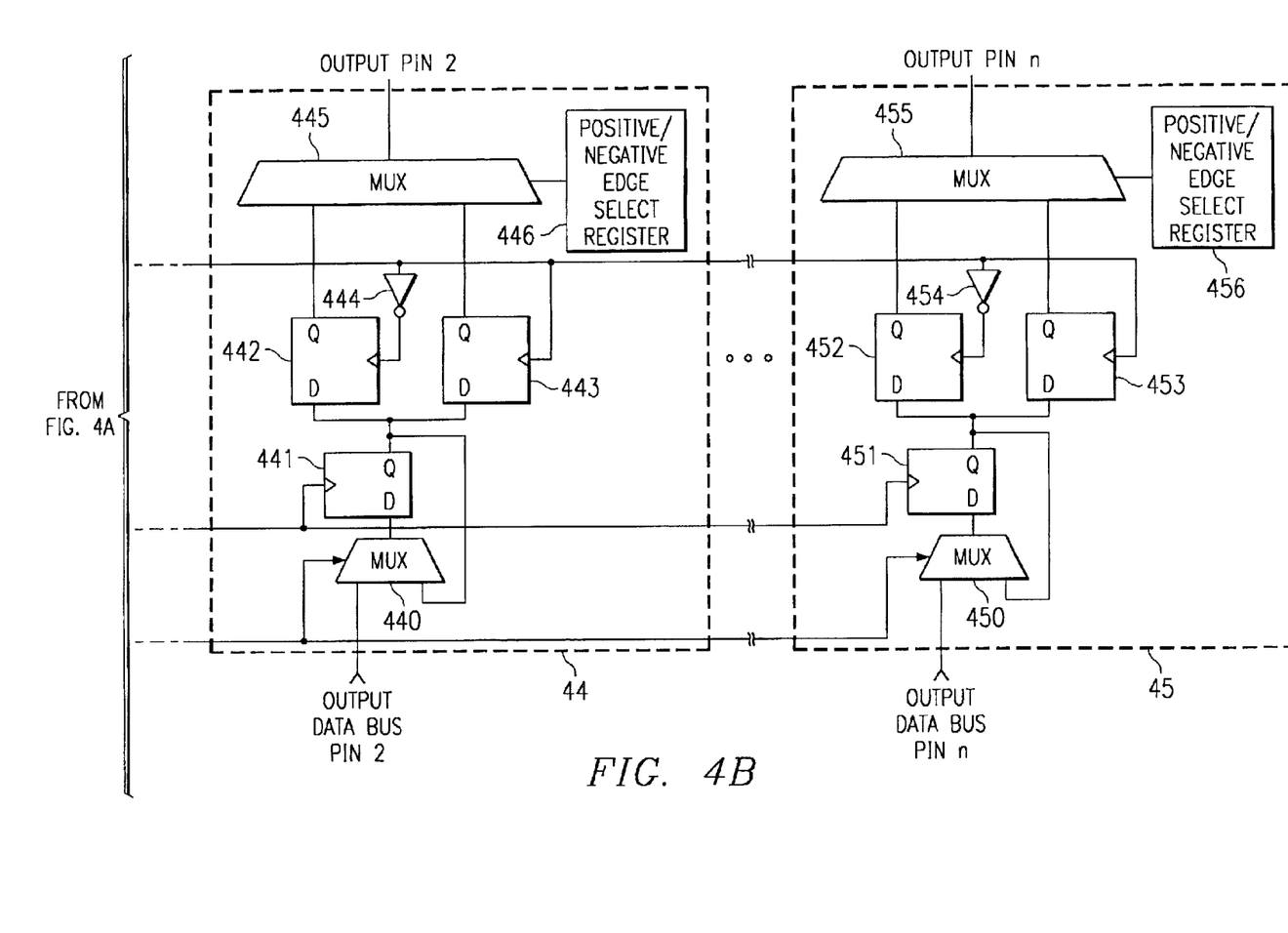

In a second embodiment, the output component is configured as an output data bus instead of a control register. FIG. 4 is a block diagram for this output data bus embodiment of the present invention. This embodiment eliminates the control registers and input multiplexers for each output pin, which were used to control the individual application devices in the preferred embodiment of FIG. 3, and replaces each of these with an additional two-input multiplexer 430, 440, 450 and flip-flop 431, 441, 451 configuration with one input of each input multiplexer 430, 440, 450 being connected to a pin from the output data bus. This embodiment allows for sequential data for controlling the various applications to be supplied from some other external source. In other words, in this case the data is just passed through the interface. The circuit is comprised of a 32-bit cycle counter 40, a control multiplexer 41, an output control register 42, and n (one for each application device) output pin circuit blocks 43–45. Also shown is a microprocessor 46 and address decoder 47 used for programming the output control register 42. At the input of each device circuit block 43–45 is the input multiplexer 430, 440, 450 and flip-flop 431, 441, 451, which are used to either retain the present state to each application device or to select a new output state from the output data bus. In other words, unless the output data bus data changes, the previous binary state is maintained. The outputs of the flip-flops 431, 441, 451 are coupled back into the second input of multiplexers 430, 440, 450, respectively, and to the 'D' input of two flip-flops 432–433, 442–443, 452–453, one of which has its clock driven by the clock signal and the other which has its clock driven by an inverted clock signal by means of inverters 434, 444, 454. The Q outputs of each pair of these flip-flops 432–433, 442–443, 452–453 switch states on the leading and trailing edge of clock signal, respectively. These outputs are connected to the inputs of output multiplexers 435, 445, 455, respectively, and one or the other input signal is selected at the multiplexer 435, 445, 455 outputs depending on the state of the positive/negative edge select registers 436, 446, 456, which controls these output multiplexers. Thus, the output pin to each external application device can be controlled by either existing data or by new data on the data bus and can be made to transition on either the positive or negative edge of the clock. As before, this bus can drive from 1 to n application devices.

In operation, the 32-bit cycle counter 40 steps control multiplexer 41 through its inputs, sequentially selecting the control bit states from the output control register 42 at the output of multiplexer 41. This control signal is then used to select one of the two inputs to the individual input multiplexers 430, 440, 450. The two inputs represent either the existing state, which is latched in flip-flops 431, 441, 451 or new output data from the output data bus. The selected data for each application device is fed into pairs of D flip-flops 432–433, 442–443, 452–453, where the output of flip-flops 432, 442, 452 transition on the leading edge of the clock and the other flip-flops 433, 443, 453 transition on the trailing edge of the clock. Finally, output multiplexers 435, 445, 455, controlled by positive/negative edge select registers 436, 446, 456, selects one or the other of the D flip-flop outputs as the output to the various application devices.

Figure 5A:
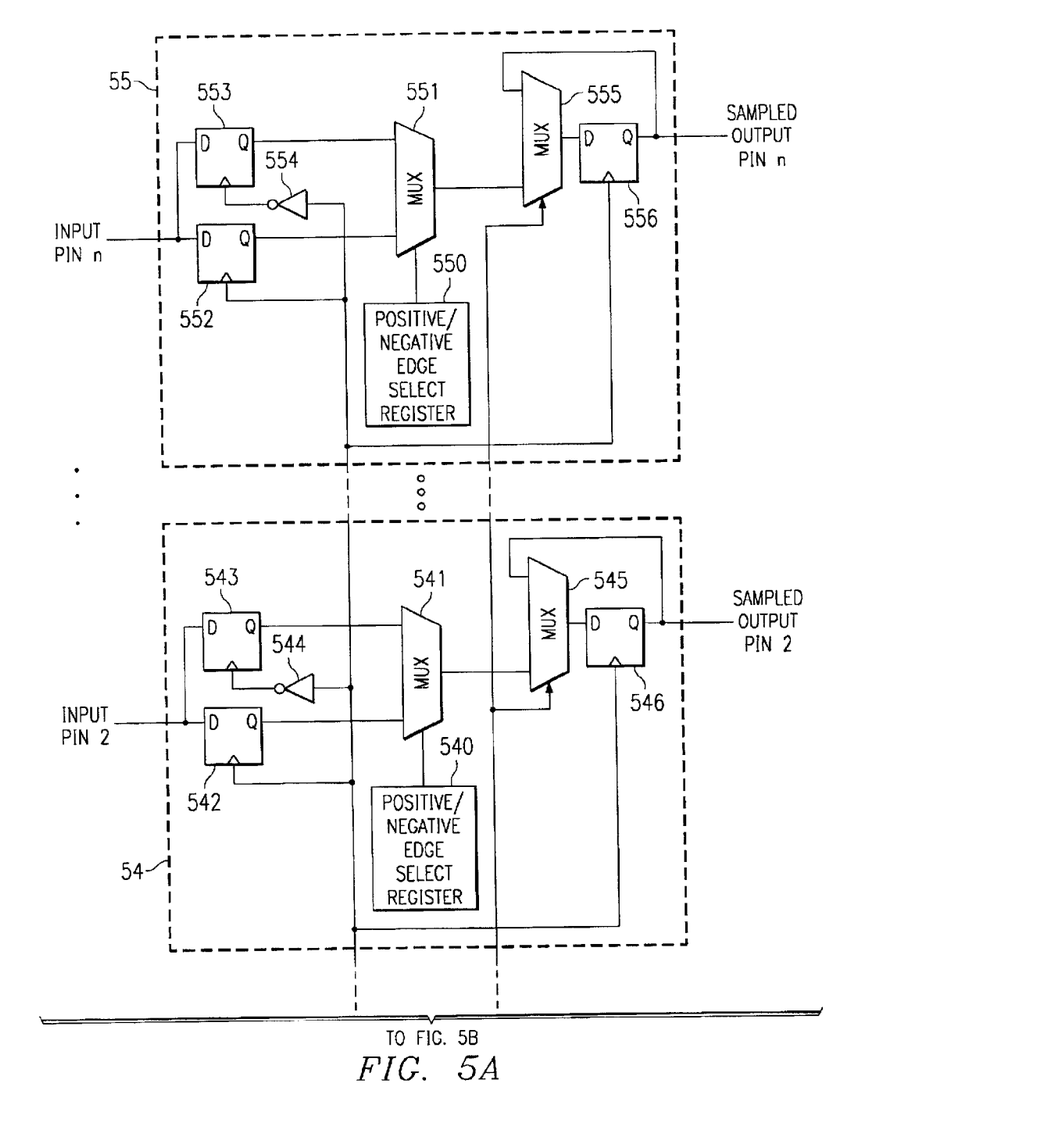
FIG. 5 is a block diagram of an input component used in embodiments of the programmable state machine interface of the present invention.
Figure 5B:
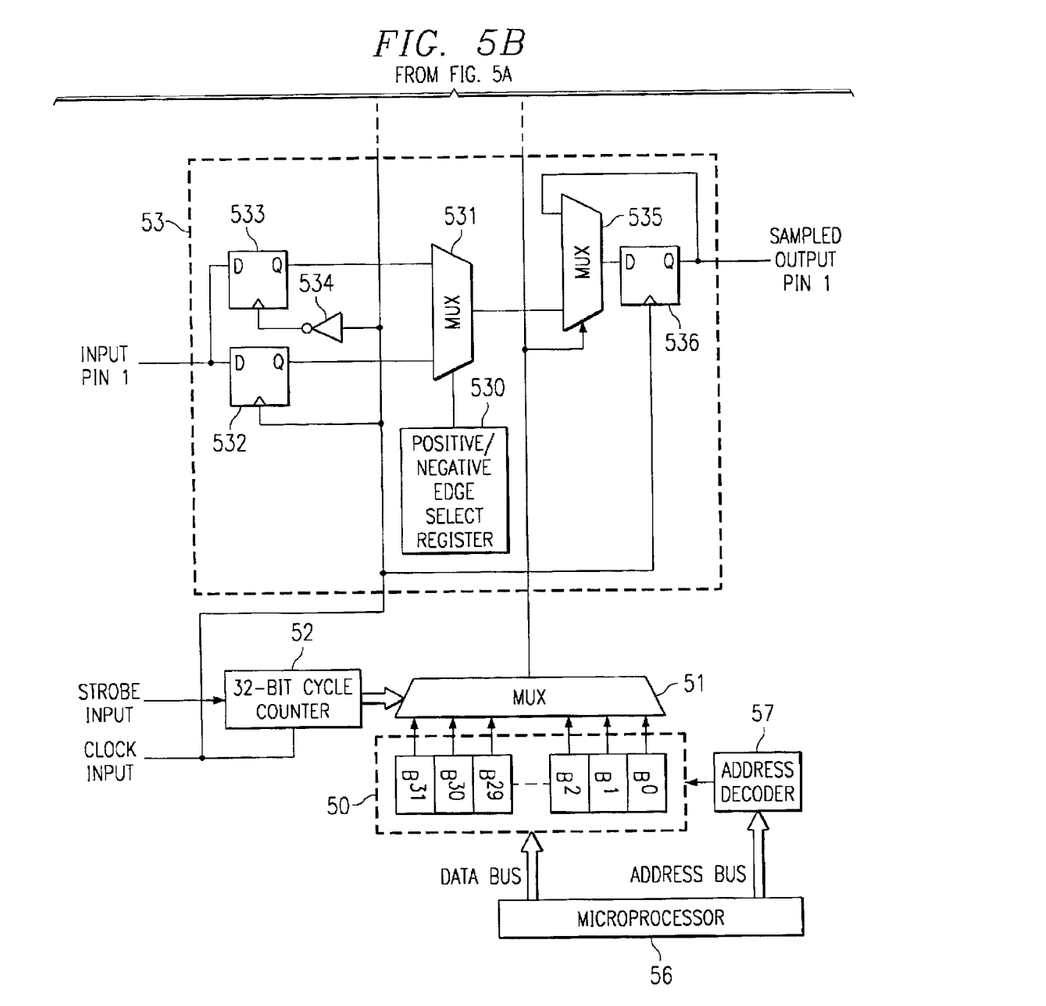

FIG. 5 is a block diagram of an input component used in embodiments of the programmable state machine interface of the present invention. This input component is comprised of an input control register 50, a control multiplexer 51, a cycle counter 52 (shown as 32-bits but can be any number of bits), and n number of input pin blocks 53–55. Also shown are a microprocessor 56 and an address decoder 57, used to program a sequential code into the control register 50. The various input pins to the interface are sampled on both the positive clock edge and the negative clock edge using pairs of D flip-flops 532–533, 542–543, 552–553. For each pair of flip-flops, one is chosen at the output of multiplexers 531, 541, 551 based on the data stored in the programmable positive/negative edge select registers 530, 540, 550. Notice, that this clock edge determination circuitry is identical to that used in the output component discussed earlier. The input data is sampled by additional multiplexers/flip-flops 535–536, 545–546, 555–556, respectively, so that when a binary 1 is in a bit of the input control register 50, the output flip-flops 536, 546, 556, will sample the respective input pins, but when a binary 0 is in a bit of the input control register, these output flip-flops will retain their previous value. This is accomplished by feeding the sampled output signals back into one input of the respective output multiplexers 535, 545, 555.

In operation, the bits of the control register 50 are sequentially chosen at the output of multiplexer 51 based on the value of the 32-bit cycle counter 52. The output of the input multiplexer 51 is then used to select one of the two inputs of the output multiplexers 535, 545, 555, which represents both new input data and the previous input data, which has been sampled-and-held. The input data bus can have as many pins as needed to interface with the various devices being controlled by the state machine.

Figure 6:
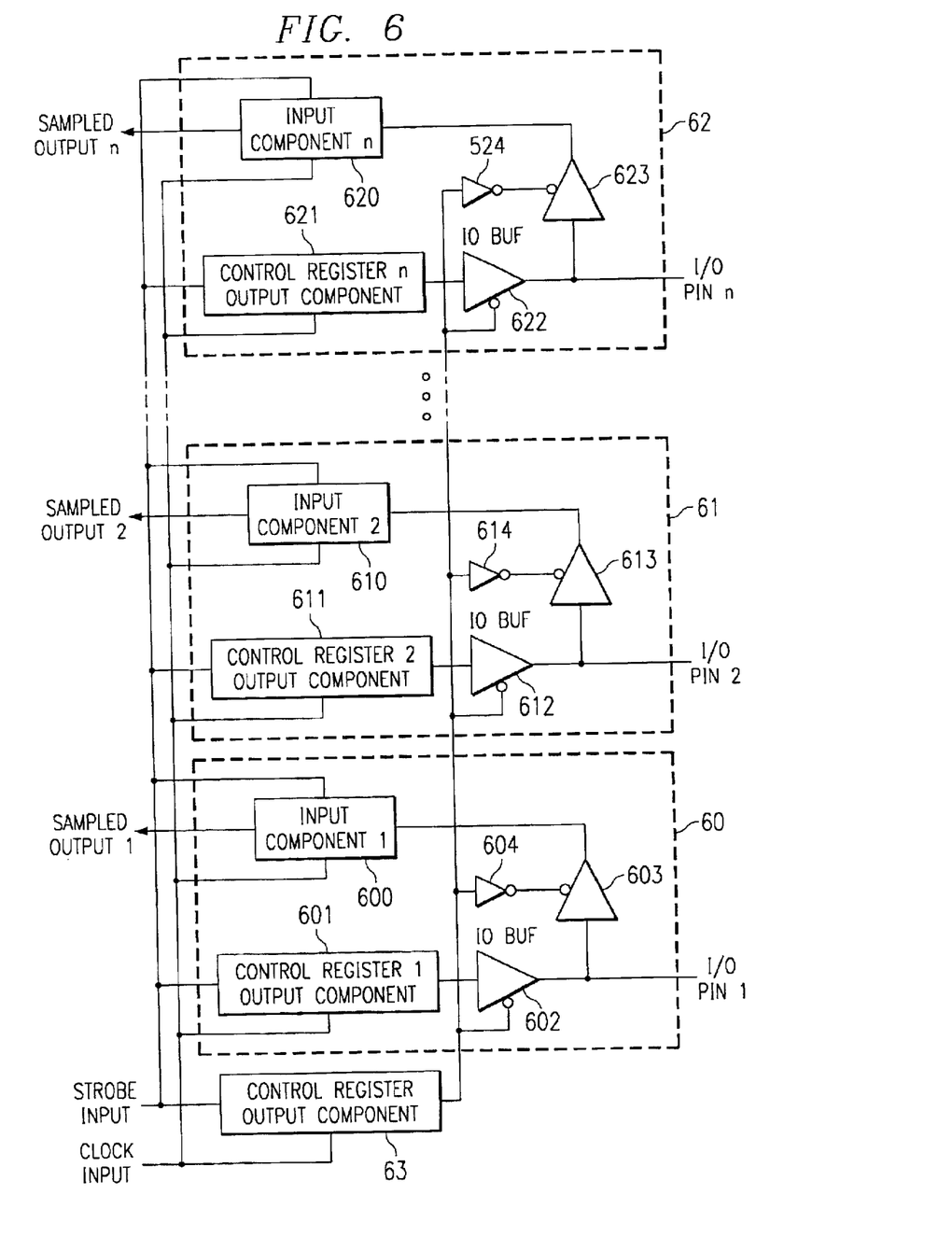
FIG. 6 is a block diagram of the preferred embodiment of the programmable state machine interface of the present invention, where the I/O pin bus output is driven by control register output components.

The output component(s) and input component building blocks discussed above can be used in combination to provide various input/output (I/O) embodiments. FIG. 6 is a block diagram for the preferred embodiment of this invention, shown driving n devices, comprising I/O circuitry for pin 1 60, pin 2 61, up to pin n 62, and an additional control register output component 63 that drives I/O tri-state buffers 602–603, 612–613, 622–623. These I/O circuits 60–62 further comprise input components 600, 610, 620 and control register output components 601, 611, 621, along with the tri-state output buffer circuitry. Tri-state output buffers 602–603, 612–613, 622–623 are used to control the I/O pins. Additional inverters 604, 614, 624 are used to cause each pair of buffers 602–603, 612–613, 622–623 to operate out-of-phase with each other, so that when the I/O is chosen as an output the buffers to the input component are tri-stated and vice-versa.

In operation, when the control register output component 63 is a binary 1, I/O buffers 602, 612, 622 are enabled and buffers 603, 613, 623 are inhibited to provide an output signal from the control register output components 601, 611, 621 to the application devices at the various I/O pins 1–n. Similarly, when output component 63 is a binary 0, I/O buffers 602, 612, 622 are inhibited and buffers 603, 613, 623 are enabled to provide inputs from the various I/O pins 1–n to input components 600, 610, 620, which in-turn supplies sample output data on the bus.

Figure 7:
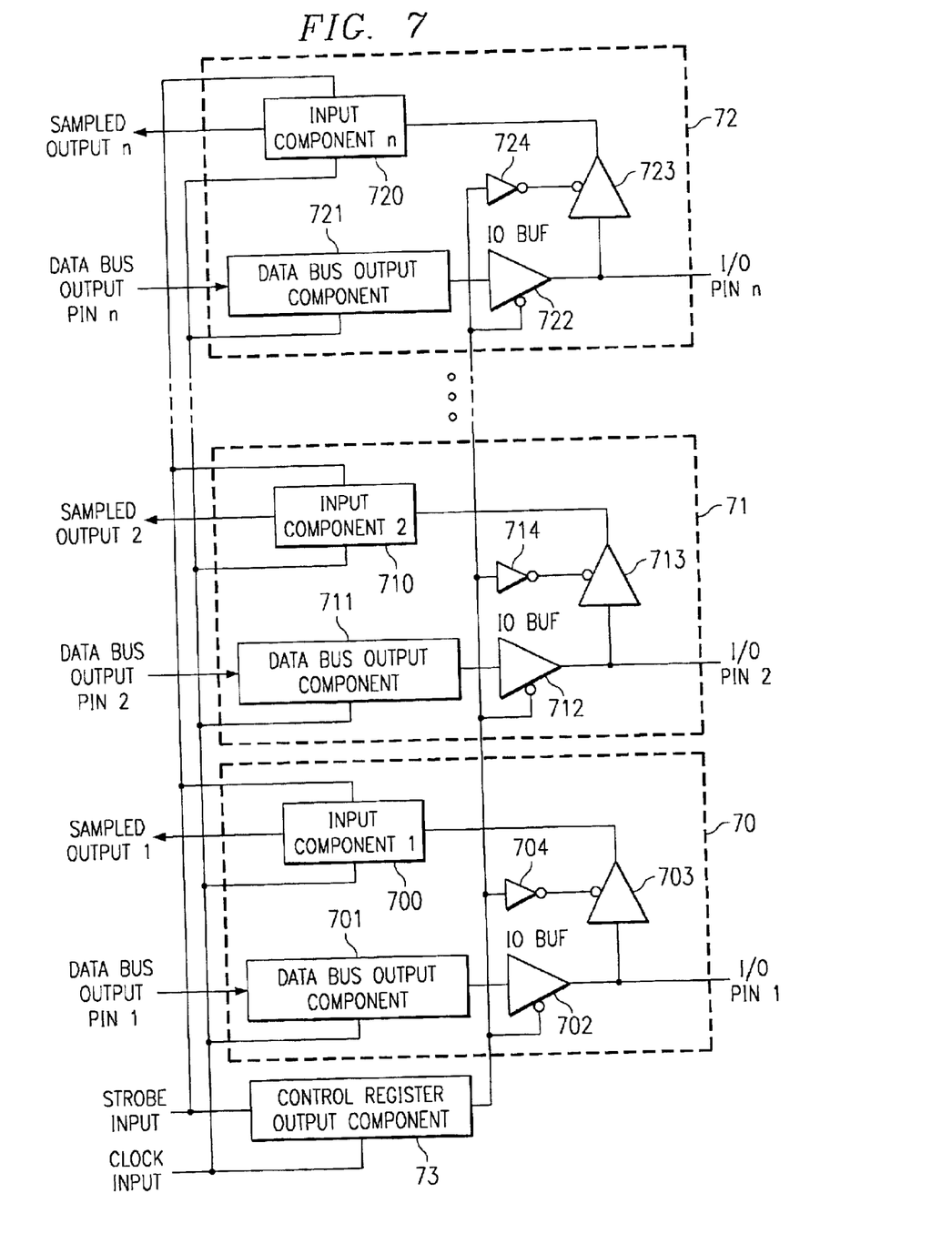
FIG. 7 is a block diagram of a second embodiment of the programmable state machine interface of the present invention, where the I/O pin bus output is driven by data bus output components.

FIG. 7 is a block diagram for a second I/O embodiment configured for an output data bus rather than an output control register. This is the same as for the preferred embodiment, except that the output data bus replaces the control register output component at each pin. This embodiment comprises I/O circuitry for pin 1 70, pin 2 71, up to pin n 72, and an additional control register output component 73 that controls the I/O tri-state buffers 702–703, 712–713, 722–723. In this case, the I/O circuits 70–72 consist of input components 700, 710, 720 and data bus output components 701, 711, 721, along with the tri-state output buffer circuitry. The tri-state output buffers 702–703, 712–713, 722–723 are used to control the I/O pins. Additional inverters 704, 714, 724 are used to cause each pair of buffers 702–703, 712–713, 722–723 to operate out-of-phase with each other.

In operation, when the control register output component 73 is a binary 1, I/O buffers 702, 712, 722 are enabled and buffers 703, 713, 723 are inhibited to provide an output signal from the data bus output components 701, 711, 721 to the application devices at the various I/O pins 1–n. Similarly, when output component 73 is a binary 0, I/O buffers 702, 712, 722 are inhibited and buffers 703, 713, 723 are enabled to provide inputs from the various I/O pins 1–n to input components 700, 710, 720, which in-turn supplies sampled output data on the bus.

A truth table for the two I/O embodiments is shown below in Table 1:

TABLE 1

| Control Register State | I/O PINS | |
| --- | --- | --- |
| | O/P | I/P |
| 0 | Enable | Inhibit |
| 1 | Inhibit | Enable |

While this invention has been described in the context of preferred embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A state machine input/output circuit responsive to a clock signal having cyclically repeating rising edges and falling edges, for providing data to an output port, comprising:

a memory having a plurality of storage elements, each storage element being adapted to store a bit and provide the bit as an output of said memory;

a first multiplexer having a multiplexer output, having a plurality of inputs receiving the outputs of said memory, and having a control input for selecting, in response to a control signal, an input for connection to said multiplexer output;

a control signal generator connected to the control input of the first multiplexer for generating a control signal to control said first multiplexer to select said first multiplexer inputs for connection to said first multiplexer output; and a clock edge selector circuit connected to said first multiplexer for providing, in response to an edge select signal, the output of said first multiplexer to said output port selectably on either said rising edges or said falling edges of said clock signal.

2. The state machine input/output circuit of claim 1, wherein said clock edge selector circuit, wherein:

the inputs of the first and second flip-flops are connected to the output of said multiplexer, said first flip-flop changing states on said rising edge of clock pulse and said second flip-flop changing states on said falling edge of clock pulse;

the outputs of said first and second flip-flops are connected to first and second Inputs of a second multiplexer;

the control input of said second multiplexer is connected to the output of an edge select register; and the output of said second multiplexer is connected to said output port.

3. The state machine input/output circuit of claim 1, further comprising a plurality of said input/output circuits, for providing data to a plurality of output ports, wherein said output ports are connected on an output data bus.

4. A state machine input/output circuit responsive to a clock signal having cyclically repeating rising edges and falling edges, for passing data from an input port to a sampled output port, comprising:

a clock edge selector circuit having an input connected to said input port and having an output, for selecting, in response to an edge select signal, data on said input port for provision to said selector circuit output selectably on either said rising edges or said falling edges of said clock signal;

a first multiplexer having a multiplexer output connected to a first flip/flop, said multiplexer having two inputs, a first one of said inputs receiving said selector circuit output, and a second one of said inputs connected to the output of said first flip/flop and to the sampled output port, and having a control input for selecting, in response to a control signal, said first input or said second input for connection to said first multiplexer output;

a control signal generator connected to a second multiplexer for generating a control signal to control said second multiplexer to select said second multiplexer inputs for connection to said second multiplexer output;

a memory having a plurality of storage elements, each storage element being adapted to store a bit and provide the bit at a memory output of said memory, said memory outputs being connected to the inputs of said second multiplexer, wherein the output of said second multiplexer selects said first input or said second input of said first multiplexer for connection to said first multiplexer output.

5. The state machine input/output circuit of claim 4, wherein:
   an input to said clock edge selector circuit is connected to the input of a second and a third flip-flop being clocked at said state machine clock rate, said second flip-flop changing states on said rising edge of clock and said third flip-flop changing states on said falling edge of clock;
   the outputs of said second and third flip-flops are connected to first and second inputs of a third multiplexer;
   the control input of said third multiplexer is connected to the output of a edge select register; and
   the output of said third multiplexer is connected to said output of said clock edge selector circuit.

6. The state machine input/output circuit of claim 4, further comprising a plurality of said input/output circuits, for passing data from an input port to a sampled output port, wherein said input port is connected to an input data bus and said sampled output port is connected to an output bus.

7. A state machine input/output circuit responsive to a clock signal having cyclically repeating rising edges and falling edges, for passing output data to an output port, comprising:
   a memory having a plurality of storage elements, each storage element being capable of storing a bit and providing the bit as an output of said memory;
   a first multiplexer having an output, having a plurality of inputs receiving the outputs of said memory, and having a control input for selecting, in response to a control signal, an input for connection to said output;
   a control signal generator connected to said first multiplexer for generating a control signal to control said first multiplexer to select cyclically said first multiplexer inputs for connection to said first multiplexer output;
   a second multiplexer having a first input and a second input, having an output, and having a control Input for selecting, in response to a control signal, an input for connection to said second multiplexer output, said first input being connected to a predetermined output data source, said output being connected to a data input of a first flip-flop being clocked at said state machine clock rate, said second input being connected to an output of said first flip-flop and to the input of a clock edge selector circuit, and said control input being connected to said output of said first multiplexer;
   said clock edge selector circuit connected to said second multiplexer for providing, in response to an edge select signal, the output of said second multiplexer to said output port selectably on either said rising edges or said falling edges of said clock signal.

8. The state machine input/output circuit of claim 7, wherein;
   the inputs of said second and third flip-flops are connected to the output of said second multiplexer, said second flip-flop changing states on said rising edge of clock pulse and said third flip-flop changing states on said falling edge of clock pulse;
   the outputs of said second and third flip-flops are connected to first and second inputs of a third multiplexer;
   the control input of said third multiplexer is connected to the output of an edge select register; and
   the output of said third multiplexer is connected to said output port.

9. The state machine input/output circuit of claim 7, further comprising a plurality of said input/output circuits, for passing output data to an output port, wherein said output port is connected to an output bus.

* * * * *